N. L. MONSARRAT.
VALVE.
APPLICATION FILED JULY 10, 1920.

1,409,893.

Patented Mar. 14, 1922.

INVENTOR.
Nicholas Lee Monsarrat.
BY F. R. Cornwall
ATTORNEY.

UNITED STATES PATENT OFFICE.

NICHOLAS LEE MONSARRAT, OF ST. LOUIS, MISSOURI, ASSIGNOR TO HENRY W. KUECHENMEISTER, OF ST. LOUIS, MISSOURI.

VALVE.

1,409,393.  Specification of Letters Patent.  Patented Mar. 14, 1922.

Application filed July 10, 1920. Serial No. 395,282.

*To all whom it may concern:*

Be it known that I, NICHOLAS LEE MONSARRAT, a citizen of the United States, residing at St. Louis, Missouri, have invented a certain new and useful Improvement in Valves, of which the following is a full, clear, and exact description, such as will enable others skilled in the art to which it appertains to make and use the same, reference being had to the accompanying drawings, forming part of this specification.

The present invention has relation to improvements in valves and consists of the novel features of construction more fully set forth in the specification and pointed out in the claims.

The object of the invention is to construct a valve that will at all times firmly seat in the valve seat irrespective of particles of carbon deposit that might be on said seat.

It is well understood that with a valve of ordinary construction, small particles of carbon projecting from the valve seat will prevent the valve from contacting with the seat at all points.

I have overcome this objection by providing the valve with a seating surface of a yielding material which, as the valve seats, will compress on the valve seat, thus yielding to any particles of carbon on the seat and bearing on said seat throughout its entire surface.

Further objects will be better apparent from a detailed description of the invention in connection with the accompanying drawings, in which,—

Figure 1:
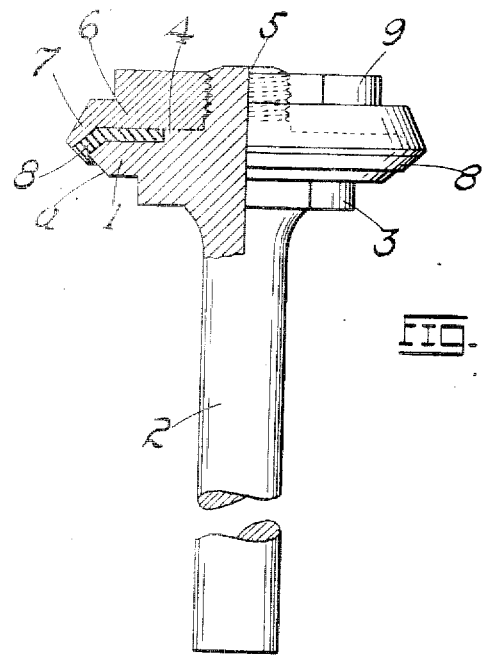
Figure 1 is a half longitudinal section through the valve, and half elevation.
Figure 2:
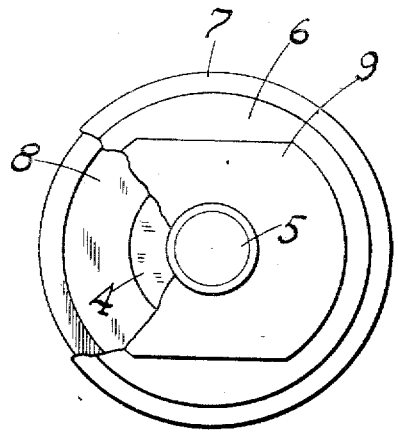
Figure 2 is a top plan of the valve with parts broken away.

Referring to the drawings, 1 represents the valve body, 2 the stem thereof, said stem terminating in a boss 3, provided with flattened sides for the application of a wrench. On the side opposite the boss 3, the valve body is provided with a neck 4, from which projects a threaded stem 5. A nut 6 provided with a flange 7 is adapted to screw onto the threaded stem 5, and a washer or gasket 8 is adapted to encircle the neck 4, and be interposed between the valve body and the nut 6. The valve body 1 is provided with a beveled edge $a$ and the outer edge of the gasket projects slightly beyond the edge $a$ and forms, when compressed, a continuation of the beveled edge $a$. The beveled edge $a$ and the gasket 8 together constitute the valve surface which is adapted to rest in the valve seat, although the gasket 8 only will contact with the valve seat under normal conditions. The nut 6 is also provided with a boss 9, having flattened sides for the reception of a wrench. The gasket 8 consists of a material or composition that is sufficiently yielding to enable said gasket to give, on coming in contact with a localized deposit of carbon, in the seating operation of the valve. The compressible or yielding gasket 8 virtually forms a seal between the valve and the valve seat, thereby causing the vale to seat perfectly, irrespective of the irregularity of the surface of the valve seat.

The gasket 8, in addition to being compressible, must also possess fire-resisting qualities by virtue of the heat generated during the operation of the engine, and my invention contemplates the use of any composition which is both yielding or compressible and fire-resisting or non-combustible. Such a composition, for instance, may be made of asbestos and graphite.

In addition to the advantages obtained by the compressible qualities of the gasket, I have found that each seating of the valve casing produces a squirming of the gasket which results in a wiping action on the seat. This continuous wiping action during operation of the engine keeps the seat polished and avoids the accumulation of carbon deposits such as are universally present in the ordinary valve.

The upper side of the valve body 1 is preferably formed with a beveled surface, and the flange 7 of the cap-nut constitutes a clamping member and has a conversely beveled overhanging surface, which, when the gasket is in position (said gasket being preferably stamped out of sheet material in flat washer form) and said cap-nut is screwed home, will firmly clamp the flat portion of said gasket in position and at the same time deflect the marginal edge thereof to produce a flaring flange which is disposed at or nearly right angles to the beveled valve seat (not shown). The edge of the overhanging flange 7 forms a guide by which the edge of gasket 8 may be dressed or ground to its seat.

Having described my invention, what I claim is:

1. A valve body formed with a beveled surface, a cap-nut formed with a conversely beveled overhanging surface, and a gasket interposed between said body and cap-nut, the marginal edge of said gasket being deflected by said beveled surfaces so as to be adapted to be presented to a valve seat at substantially a right angle.

2. The combination of a valve body element having a beveled surface, and a cap-nut element having a conversely beveled surface, said elements having threaded engagement, and a gasket clamped between said elements and the edge of which is deflected by said beveled surfaces.

3. The combination of a valve body element having a beveled surface, a cap-nut element having a conversely beveled surface, and a gasket of compressible incombustible material clamped between said elements, the edge of which gasket is deflected by said beveled surfaces and extends slightly beyond the edge of the beveled surface of the valve body element.

4. A valve for an internal combustion engine, the seat engaging portion of which consists in part of the edge of a sheet of compressible incombustible material which sheet is adapted to be presented perpendicularly to the valve seat.

5. In a valve for an internal combustion engine, a seat engaging disk provided with a zone of compressible incombustible material extending slightly beyond the seat engaging portion of said disk said material being held firmly up to the extreme edge of the disk.

In testimony whereof I hereunto affix my signature this 30th day of June, 1920.

NICHOLAS LEE MONSARRAT.

Certificate of Correction.

It is hereby certified that Letters Patent No. 1,409,393, granted March 14, 1922, upon the application of Nicholas Lee Monsarrat, of St. Louis, Missouri, for an improvement in "Valves," were erroneously issued to Henry W. Kuechenmeister, as assignee of the entire interest in said invention, whereas said Letters Patent should have been issued *to the inventor, said Monsarrat, and Henry W. Kuechenmeister, jointly*, said Kuechenmeister being assignee of *one-half* interest only in said invention, as shown by the records of assignments in this office; and that the said Letters Patent should be read with this correction therein that the same may conform to the record of the case in the Patent Office.

Signed and sealed this 9th day of May, A. D., 1922.

[SEAL.]
KARL FENNING,
*Acting Commissioner of Patents.*